2211X
J. Bazin, Jr.
Knitting Mach.
Patented Oct. 28, 1814.
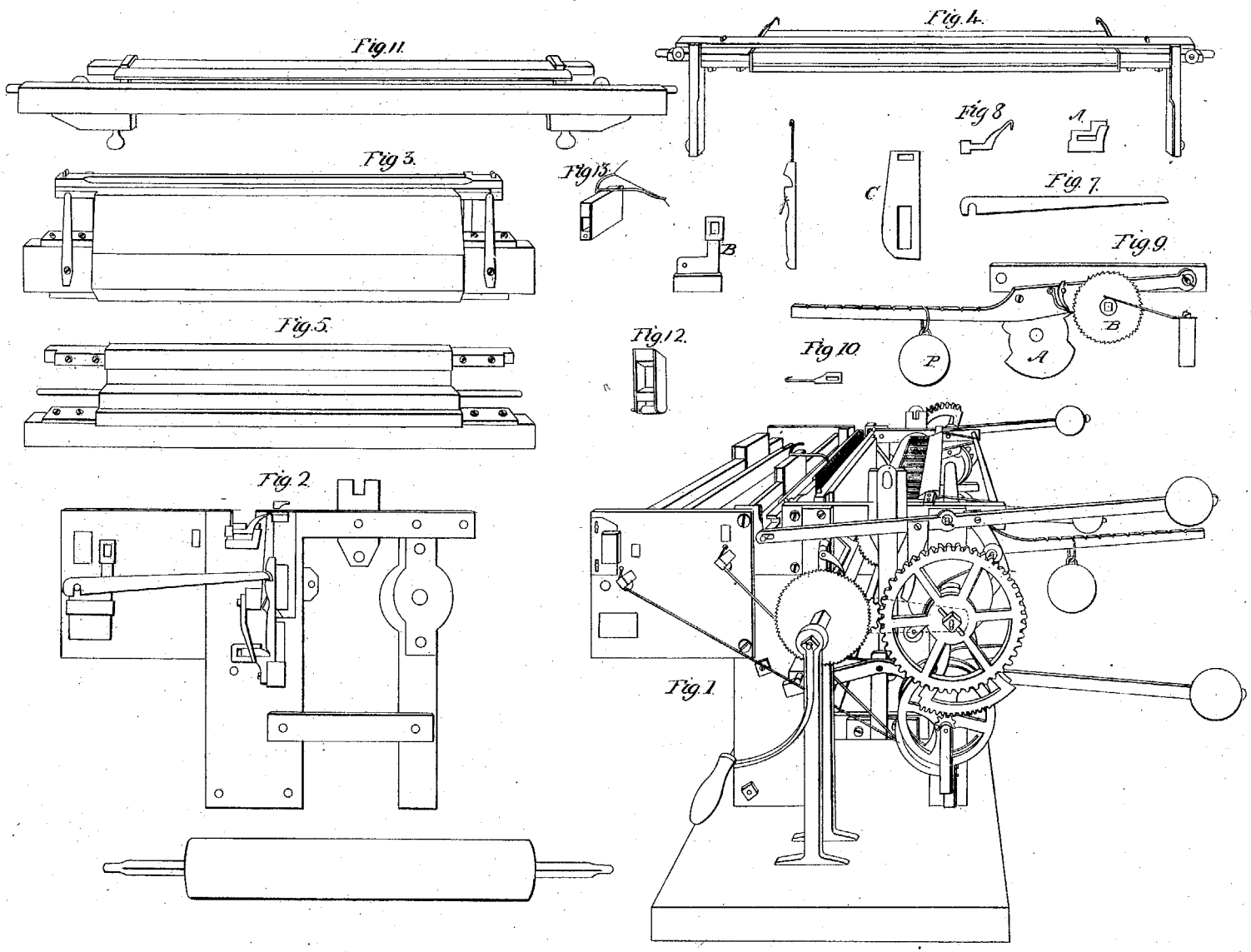
N. PETERS, PHOTO-LITHOGRAPHER, WASHINGTON, D. C.

[illegible] Oct 28, 1814

2211X

John [illegible] Bazing [illegible]

Letters Patent

The Schedule referred to in these Letters Patent and making part of the same
containing a description in the words of the said John Bazing [illegible] hereof of
his improvement in the Stocking Loom This improvement in the Stocking Loom consists of a [illegible] machinery construc-
ted according to the following description. A bench formed by a plank of hard
wood 3 feet long and 1 foot wide having 4 legs to it of a suitable height. a [illegible]
frame 23 inches wide and 12 inches high fastened on the top of the bench. The
front standards of the frame 2 cast iron plates 4 inches wide held together by
3 horizontal iron bars or pillars 22 inches long (two at the bottom and one in
the middle) passed through them and fastened by a nut and screw at each
end at the top of the standards screwed on the inside a horizontal iron bar [illegible]
inches long & one 3 inches from the bottom 7 inches long. The back standard a
cast iron plate 1/2 in wide screwed on the bars parallel to the front standards
& 4 inches from them having on the edge towards the front a circular projection
and in the back edge 3 inches from the top a notch 1/4 inch wide cut in as far
as the centre. a round iron pillar 21 inches long passing through the ends of
the top bars and fastened by a nut and screw at each end. at the top of the
front standards screwed on near the edge a cast iron plate 6 inches wide pro-
jecting out 6 inches in front. on the top bars an iron or brass plate about 2
inches wide and 4 inches long screwed on between the standards having a grooved
top and a round hole 2 inches below the top of the bar, an iron axle 1/2 inch
diameter the gudgeons working in a brass plate screwed on the back standard
over the notch projecting out at each side of the frame about 3 inches and squar-
ed. the end of the axle on the right side of the frame rounded 1/2 an inch in
length. On the right side of the frame a cast iron standard 12 inches high
screwed on the bench having an arm on one side 3 inches long with a hole in
the end through which the end of the large axle passes. A standard 10 inches
high screwed on the bench parallel to the other. An axle the gudgeons working in the Standards having a pinion on the end next the frame & a ratchet wheel be-
tween the two standards. on the top of the inner standard a click to prevent the
axle from being turned backwards. on the large axle a cog wheel 8 inches diam
eter. on the arm of the standard a pinion on an axle between the cogwheel on the
large axle. and the pinion on the axle; a winch on the outer end of the small
axle. the axle being turned by the winch the pinion on the end turns the pinion
on the arm of the standard and the cog wheel on the large axle. the large axle
makes one turn to four of the small axle. Across the frame having the ends
fixed in the front standards 2 inches from the top. 2 polished steel bars pla-
ced parallel 3/8 of an inch apart one in front of the other. the front bar half
the width of the back: a slaie between the bars formed by thin plates of pol-
ished steel. cast in lead about 4 times their thickness put upon the back
bar and pressed together by iron or brass plates 3 inches long screwed on the
top and back of the bar at each end, the steel plates as wide as the space between
the bars. and as high as the top of the frame the lead cast on the steel plates co-
vers the under side. back and top of the bar. leaving a perpendicular open-
ing between each plate for the needles to move in. through the top of the slaie
1/16 of an inch from the upper edge an aperture 7/8 of an inch long across the top
of the slaie and 3/8 of an inch wide: at each end of the slaie pieces on the
bar a piece of brass or iron of the same form to prevent the slaie leads from bend
ing. a steel plate screwed on the outside of the front standards at the top
having a groove at the top 1/4 inch deep & a corresponding groove in the stan
dard 1/2 an inch wider toward the front. A steel Bar called the tick-
ler bar laying across the frame in the grooves in the steel plates. projecting
out about 3/4 of an inch at each side and turned round at the ends on
the upper side of the bar at each end a piece of iron or brass 3 inches long
and on the under side a perpendicular guide formed by a piece of iron bent right
angular one side screwed to the bar by 2 screws passing thro' into the pieces of
iron on the top. the other side of the angle about 1/4 of an inch from the standard.
on each end of the bar and guides a friction roller working against the in-
side of the standard. the end of the guides rest against a pin screwed into the
standard. ~~and~~ On each end of the bar in front of the slaie a spring one end
pressing against the tickler bar the other end against the ends of the guides a 9 slace formed by thin plates of polished steel and cast in leads of the same thickness for
the needle [illegible] leads & put on the [illegible] bar the steel plate on the [illegible] and top
of the bar about 1/2 of one inch wide and the end of the top [illegible] of the needles 1/2
an inch wide the leads of the slace occupy the [illegible] side of the bar and [illegible]
towards the needle as high as the top of the steel plate. the [illegible] and plates
in the ends of the bar hold the slace together. Two bars laying across the
frame in front. one over the other the ends fixed in the plates in the front
standards. the lower bar 1 1/2 inch wide and 1 inch thick. the upper bar
1/2 an inch wide and 3/8 of an inch thick placed 3 inches above and over
the inner edge of the under bar. a slace on the bar formed by thin plates
of polished steel cast in leads of the same thickness as the needle and [illegible]
the slace leads: the plate in form a right angle one side 1/2 an inch wide.
the other one inch wide. on the end of the narrowest side of the angle a lead
cast on having a hole thro' to fit the upper bar. along the outer edge of the
wide side a lead cast on about 5/8 of an inch wide resting on the under bar.
thro the end of the widest side of the slace plate a round hole one quarter of
an inch diameter. The slace pieces pressed together by brass or iron plates
screwed on each side of each end of the ~~[illegible]~~ bar and on the top of the un-
der bar. A round steel axle 24 inches long passed thro' the holes in the
slace. and through the side of the frame for the sinkers to work upon. A
needle similar ~~similar~~ to a needle in a common stocking loom) about 2 inch
es long having a flute in the stem as high as the point of the eye cast in a
lead or soldered in a steel plate 4 1/2 inches long and 1/2 an inch wide. in
each needle plate in the front edge a spring. above the spring a notch 1/4
of an inch deep & 1/4 of an inch from the bottom a notch 1/16 of an inch deep.
the needle put between the slace and the spring pressing against the front bar
holds it [illegible] and admits of its sliding freely up and down. The sinker a piece
of steel about 8 inches long. 3/4 of an inch wide at one end and 1/4 of an
inch at the other at the largest end a notch 1/4 of an inch wide & 1/2 an
inch deep. The sinker passed through the slace. the small end between the
needle slace and laying in the notch at the top of the needle head and the
notch at the large end on the axle in the sinker slace. A [illegible] (similar
to a [illegible] in a common stocking loom) about 3/4 of an inch long having a flute along the front of the [illegible] to the point cast in a lead and [illegible] be-
tween the slace on the tickler bar. the lead a little wider than the slace
plates and formed to fit the opening between; the end that has the tickler
projects above the edge and over the end of the slace towards the needles. the
ticklers standing above the lead inclined towards and bent down against the
face of the needles. the point entering the flute & the tops of the bends a little
wider than the eye of the needle. and sloped down towards the point. The
ticklers held in the slace by an iron bar laying on top of them and fastened to
the tickler bar by a thumb screw at each end. The holes at the ends of the
bar are lengthwise so that the bar can be taken off without drawing out
the screws. On the front of the guides of the tickler bar. a piece of iron ri-
veted, projecting above to prevent the top bar from bearing against the screws at
the top of the groove in the steel plate at the top of the standards a notch about
1/8 of an inch deep the tickler bar when raised up is pushed into it by the spring
so that the points may stand clear of the needles. A bar called the gage
bar 19 inches long passed thro the slace back of the needles. leaving 1/8 of an inch
space between them & the bar. On the top of the slace a bar called the stop
bar to hold down the stocking piece when the needles rise up. fastened to the gage
bar by a thumb screw at each end. the holes in the stop bar are lengthwise
so that it can be taken off without drawing out the screws. A spring
screwed on each end of the slace bar. the end resting against the gage bar
Inside of the frame on the large axle a solid wheel of brass or iron 3 inches
diameter having two notches in the edge about 1/4 of an inch deep and 1/4
of the circumference of the wheel in length. a square iron axle called the
[illegible] axle the gadgeons working in a brass plate screwed on the outside of
the standards back of the needle slace bar. having an iron arm 4 inches
long screwed on at each end resting against the end of the gage bar; an iron arm
6 inches long screwed on the end. having at the end a pin resting on the
edge of the wheel on the axle. The axle pushes forward the gage bar against
the needles by the wheel raising the pin on the [illegible] out of its notch. holds it
against them while they are rising up until the ticklers come down and take
up the loops. the notch in the wheel then coming under the pin on the end
of the arm the springs push back the gage bar. A cylinder of wood 19 inches
long and 3 inches diameter covered with cloth having an iron axle placed thro the
centre [illegible] below the top of the frame, on the [illegible] on the top bar, on the
end of the cylinder a ratchet wheel, inside of the frame on the large axle a solid
wheel of brass or iron 4 inches diameter having a notch in the edge on each
side of the centre 3/4 of an inch deep 1 1/2 inch wide at the top. An iron
lever 13 inches long working on a pin at the end of the top bar [illegible] the
front standard and laying between the ratchet wheel on the cylinder
and the wheel on the large axle having a click to catch in the teeth of
the ratchet wheel on the cylinder, a moveable weight and notches cut in
the upper edge like a steel yard and a pin on the side to rest on the [illegible]
wheel on the large axle so that the notch in the wheel coming under the
pin the lever falls and turns the cylinder: The notches in the wheel so
placed that the lever falls when the lever [illegible] has pushed forward the
[illegible] bar against the needles. On the slaie bar a spring screwed on the
end resting on the axle of the cylinder to prevent it from turning [illegible]
when the lever rises up. A moveable iron bar resting at the ends on the
top bars of the frame, having at each end on the under and upper side
a piece of brass or iron 2 1/2 inches long screwed together by 2 screws pass
ing thro the bar: On the bar as many carriers as there are needles on
the frame and so placed on that the bar being brought forward to the nee
dles, they pass between them and rest on the edge of the slaie. The carrie
are needles (similar to the working needles) 1 1/2 inch long [illegible] in a [illegible]
as thick as the slaie bar having a hole through it to fit the bar.
on each end of the carrier bar, a chain passed over the top pillar of the frame
and fastened to a hook at each end of the cylinder. At each side of the
frame upon the outside on the large axle a solid wheel of brass or iron 4 inc
in diameter having 4 pins placed at equal distances on the surface 1/4 of
an inch from the edge two on each side. over the wheels a pivot screwe
on the back standards: An iron lever or balance 13 inches long workin
on the pivot having an oblong hole at one end thro which the end of the
[illegible] bar passes and a brass or leaden ball on the other end to counte
poise the [illegible] bar, on the inside of the lever a piece of steel 3 1/2 inch
long screwed on between the centre and ball. the end laying against the inner surface of the wheel. the pin on the wheel striking the end [illegible] up
the bar and [illegible] the tickler bar. On the outside of the lever a piece of [illegible]
3/8 inches long screwed on between the centre & the tickler bar. the end
lay up against the outer surface of the wheel. the pin on the wheel striking
the end carries up — the lever and raises — the tickler bar. the ends of
the pieces so inclined that the operation of raising or falling is perform-
ed [illegible] the wheel makes a twentieth part of a turn. The tickler bar
rises or falls one 1/4 of a turn of the axle. and the points of the ticklers enter the
[illegible] in the needles about 1/8 of an inch above the edge of the slaie and pass
down between it. Under the needle slaie bars a groove thro each standard
2 1/2 inches high & 3/4 of an inch wide. A bar called the needle lifter bar
an inch wide lying across the frame in the groves and projecting out at each
side about an inch. having a round pin in each end. On each end a
friction roller working against the inside of the standard. A bar called
the catch bar to which the needles hold when sunk down by the notch at
the bottom of the plate 18 inches long raised above and attached to the
lifter bar by an iron staple on each end. the staples at one end bent down
and screwed on the front side of the lifter bar. the catch bar lays on the
lifter bar so as to bring the edge within a perpendicular line drawn from
the inside of the front bar of the needle slaie. The edge sloped from the top to
the under side having a notch at each end about 1/2 an inch deep. a
piece of steel three inches long screwed on the front bar of the needle slaie
near each end inclined down to the lifter bar and pressed into the notches
in the catch bar: On each end of the catch bar a spring passed thro the
staples pressing the bar against the inclined pieces under the needle lifter
bar. at each end a regulating gage formed with a piece of iron about
3 inches long having an oblong hole at one end and fastened to the bar by a
thumb screw, passed thro it into the bar one end sloped to rest on the bot-
tom of the groove on the standard. An iron — standard 3 inches high
screwed on the lower bar on each side of the frame. bent at the bottom so
as to stand off from the frame as far as the end of the lifter bar.
A lever 9 inches long at each side of the frame fastened on the standard
at the top by a screw on which it turns freely. one end [illegible] the pin on the ends of the lifter bar, the other projecting beyond the large axle [illegible]
[illegible] having a notch cut in the upper edge two inches long from the cen
tre. On the large axle over the levers on each side of the frame two [illegible]
iron arms extending off about 2 1/2 inches from each side of the centre
of the axle having friction rollers at the ends. the arms strike the levers up
to the cylinder lever falls and draws off the works, and turning towards the
centre of the levers raises the needles lifter bar whilst the axle performs
about 1/20 of a turn, operating upon them twice every turn and raises
the needles up about one inch. the catch bar draws out the notches in the
needle plates by sliding against the inclined [illegible]. the lifter bar falls when
the end of the arm comes over the bend or notch in the levers and the catch
bar comes in over the bar. A bar lying across the frame over the sinker [illegible]
to the ends passes through a groove in each side plate and projecting [illegible]
1/4 of an inch a regulating gage at each end of the bar formed with a thin
steel plate having a notch on edge to fit the bar. and two long grooves [illegible]
fastened to the side of the frame by a flat headed screw passed thro' each
groove in the bar. an iron frame or slider having friction rollers to work
upon the under side of the bar & at the bottom of the frame a roller about
1/2 an inch diameter to work upon the sinkers and sink the needles simi
lar to a roller and frame in the common stocking loom. A bar lying
across the frame in the front plates 1/2 an inch from the top between the sink
er [illegible] and tickler bar having on it an iron frame or slider called the
shuttle frame. on top of the frame a piece of steel screwed on one end
touching the front of the needles having a piece of steel on it about 1/3 its
length raised an inch above at the end. thro' the end of each a round
hole finely polished for the thread to run thro'. on the outside of the frame
at each side under the ends of the large axle. 2 wheels about 4 inches
diameter having a groove round the rim. and a pinion on the centre
with 12 leaves. and working on an axle screwed into the back standard.
an iron brace bent angularly and screwed on the standards under the
wheels to support the end of the axle. under each wheel a spring 2 inch
es long screwed on the brace & laying against the rim of the wheel in
front. having a groove thro' each one eighth of an inch wide and abo 1 inch long and at the end of the groove [illegible] on the end of the spring
a piece of brass about 1/8 of an inch thick. Under each end of the roller
bar and shuttle bar a boxed pulley screwed into the side of the frame
& a small hole thro' the frame over the pulleys. A cord fastened to the
roller frame at each side passed over the pulley and thro' the spring &
fastened to the inner wheel at each side of the frame. A cord fastened
to the shuttle frame at each side passed over the pulley & thro the spring
and fastened to the outer wheel at each side of the frame. One each end of the
large axle 2 section wheels to turn the roller and shuttle wheels being 1/4 of
a circle of 8 inches in diameter. so placed that the two on one end being
down and working in the pinions of the wheels. those on the other end are up.
The outer section wheels turn the outer or shuttle wheel by 3 or 4 teeth
before the inner or roller wheel so as to draw the shuttle partly across
the frame before the roller. the section wheels being to operate on the wheels
as soon as the [illegible] bar comes down the cords winding round the wheels
on one side [illegible] the cords from the wheels at the other side of the
frame. by being passed thro the springs the cords stop the wheels
when unwound by striking against the top of the hole thus causing
the wheel to stop always at the same place. and preventing the teeth
of the wheel from striking on top of the leaf of the pinion. the shuttle and
roller are drawn across the frame twice each turn of the axle. first by
the section wheels at one end of the axle. then by those at the other
end. A cylinder of wood 17 inches long & 8 inches diameter having
an iron axle passed thro' the centre the gudgeons fitting the grooves
in the plates on the top bars of the frame a lever at each side of the
frame 18 inches long close against the side of the frame over the axle
of the roller and shuttle wheels and working on a screw at the back
of the front standards 6 inches from the top. a thin steel plate
about 8 inches long screwed upon the levers 3 inches from their centre &
working freely under the screw having a long hole at the end for the gudg-
eons of the cylinder to pass thro. on the end of the levers a ball or weight by
which the cylinders are pressed together. To prepare the loom for beginning
the work take off the upper cylinder put on the canvas [illegible] the

3211X

[illegible] over the upper pillars of the frame and fasten them to the hooks on the
lower cylinder. take off the top bar and bring forward [illegible] bar so that the
[illegible] pass between the needles. place the reel on which the thread or yarn to
be wove is to be wound at the back of the loom & lead the thread through the [illegible]
in the shuttle. wind the ends of it round the first needle and work down 3
or 4 inches with the thread doubled so as to fasten the end then turn the
winch to draw the shuttle and rollers across the loom. then back the carrier can
be taken up the hooks and tighten the chains of the [illegible] by turning the cylin-
der. put on the top bar and screw and screw it down. turn the winch un-
til the carrier bar and work are drawn over the cylinder. put on the upper
cylinder and [illegible] the [illegible] plate on the [illegible] over the gudgeons of the cylinder.
then take off the main bar and the work being pressed between the cylinders it
is drawn off by them. For narrowing make use of ticklers take off the top
bar and the bar that holds in the ticklers and having narrowed by putting
two or more loops on one needle take away the tickler and sinkers from the
vacant needles & put on the bars. For weaving pieces in two or more parts the
bounds are laid by hand and the ticklers & sinkers after narrowing are left
in their places. By the regulating gauges on the top bar and on the
roller frame bar the loom can be set to make the web slack or tight.
Looms for weaving ribbed work also for double work may be constructed
on the same principle as the loom above specified & described. The loom
may be turned by water machinery or by a steam engine Witnesses
Stephen Bazin
James A Bazin J. Bazin Junr

30

References to the Drawing of John Bazin Junrs Stocking Loom

The parts are figured in the order as they are described
in the specification.

Fig. 1. The stocking loom in perspective.

Fig 2. A section - the outline showing the side plates, the shaded parts the needle, ticklar and sinker and an end view of the different bars in the drawing.
" 3. Needle slaie bar, the piece marked C. being one of the slaie pieces cast in a lead.
" 4. Ticklar bar. The piece marked A. one of the slaie pieces and Fig 8 a ticklar cast in a lead.
" 5 Sinker slaie bar. B one of its slaie pieces.
" 6 Needle and needle plate.
" 7 A sinker (its operation is the same in principle as the jack of the common stocking loom and should have been so called)
" 8. The ticklar cast in a lead.
" 9. A section of fig 1. A is the cam on the main shaft to lift the lever and weight P. B. is the ratchet wheel on the cylinder on which the stocking winds.
" 10 The carrier. the Carrier bar and carriers can be seen on top of the perspective fig 1.
" 11 Needle lifter bar. and catch bar on top
" 12 The roller and frame which works the sinkers (or jacks) it answers to what is called the Slur in the common stocking frame
" 13 Shuttle frame.

---

(Loose sheet accompanying the Patent returned for record.)